United States Patent
Brommer et al.

(10) Patent No.: US 7,486,722 B2
(45) Date of Patent: Feb. 3, 2009

(54) BANDWIDTH EFFICIENT CABLE NETWORK MODEM

(75) Inventors: Karl D Brommer, Hampton Falls, NH (US); Edward D Russell, Hollis, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 802 days.

(21) Appl. No.: 10/486,004

(22) PCT Filed: Jun. 2, 2003

(86) PCT No.: PCT/US03/17449

§ 371 (c)(1),
(2), (4) Date: Feb. 3, 2004

(87) PCT Pub. No.: WO2004/062124

PCT Pub. Date: Jul. 22, 2004

(65) Prior Publication Data

US 2004/0244044 A1 Dec. 2, 2004

Related U.S. Application Data

(63) Continuation-in-part of application No. 10/125,241, filed on Apr. 18, 2002, now Pat. No. 7,233,620.

(60) Provisional application No. 60/434,006, filed on Dec. 17, 2002, provisional application No. 60/284,629, filed on Apr. 18, 2001.

(51) Int. Cl.
*H04B 1/38* (2006.01)
*H04L 5/16* (2006.01)

(52) U.S. Cl. ............... 375/222; 375/220; 375/221; 725/111

(58) Field of Classification Search ................ 375/220, 375/221, 222, 224, 225, 219, 240, 324, 227; 725/111, 124, 126, 105, 110; 370/329, 342, 370/355, 431, 441, 347
See application file for complete search history.

(56) References Cited

U.S. PATENT DOCUMENTS 4,053,837 A 10/1977 Ryan et al.

(Continued)

FOREIGN PATENT DOCUMENTS

JP 11340952 12/1999

(Continued)

OTHER PUBLICATIONS

PCT Search Report dated Aug. 2, 2002 of Patent Application No. PCT/US02/12401 filed Apr. 18, 2002.

(Continued)

*Primary Examiner*—Chieh M Fan
*Assistant Examiner*—Qutbuddin Ghulamali
(74) *Attorney, Agent, or Firm*—Vern Maine & Associates

(57) ABSTRACT

A MUD enabled cable modem that provides efficient use of cable television network bandwidth in the presence of interference and noise is disclosed. The modem design provides for compatibility with existing network hardware and protocols so that bandwidth efficient modems configured in accordance with the principles of the present invention may be added to the network without removing installed hardware and software. A bandwidth efficient modem in the cable network head-end increases reverse link capacity from the terminals to the head end, while bandwidth efficient modems in cable network terminals increases forward link capacity from the head end to the terminals. Bidirectional bandwidth efficiency is thereby enabled.

22 Claims, 13 Drawing Sheets

U.S. PATENT DOCUMENTS

| | | | |
|---|---|---|---|
| 4,085,378 A | 4/1978 | Ryan et al. | |
| 4,270,179 A | 5/1981 | Sifford et al. | |
| 4,290,139 A | 9/1981 | Walsh | |
| 4,422,175 A | 12/1983 | Bingham et al. | |
| 4,580,276 A | 4/1986 | Andruzzi, Jr. et al. | |
| 4,633,482 A | 12/1986 | Sari | |
| 4,750,171 A | 6/1988 | Kedar et al. | |
| 4,794,635 A | 12/1988 | Hess | |
| 5,049,832 A | 9/1991 | Cavers | |
| 5,113,414 A | 5/1992 | Karam et al. | |
| 5,243,624 A | 9/1993 | Paik et al. | |
| 5,546,379 A | 8/1996 | Thaweethai et al. | |
| 5,596,439 A | 1/1997 | Dankberg et al. | |
| 5,652,866 A * | 7/1997 | Aldred et al. | 703/23 |
| 5,721,756 A | 2/1998 | Liebetreu et al. | |
| 5,732,333 A | 3/1998 | Cox et al. | |
| 5,752,164 A | 5/1998 | Jones | |
| 5,760,646 A | 6/1998 | Belcher et al. | |
| 5,778,029 A | 7/1998 | Kaufmann | |
| 5,867,065 A | 2/1999 | Leyendecker | |
| 5,894,500 A | 4/1999 | Bruckert et al. | |
| 5,987,061 A * | 11/1999 | Chen | 375/222 |
| 6,052,364 A | 4/2000 | Chalmers et al. | |
| 6,061,406 A | 5/2000 | Carson et al. | |
| 6,118,335 A | 9/2000 | Nielsen et al. | |
| 6,141,390 A | 10/2000 | Cova | |
| 6,185,197 B1 | 2/2001 | Cheung Yeung et al. | |
| 6,222,878 B1 | 4/2001 | McCallister et al. | |
| 6,226,277 B1 | 5/2001 | Chuah | |
| 6,236,837 B1 | 5/2001 | Midya | |
| 6,240,099 B1 | 5/2001 | Lim et al. | |
| 6,240,278 B1 | 5/2001 | Midya et al. | |
| 6,282,247 B1 | 8/2001 | Shen | |
| 6,408,019 B1 | 6/2002 | Pickering et al. | |
| 6,417,672 B1 | 7/2002 | Chong | |
| 6,442,217 B1 | 8/2002 | Cochran | |
| 6,512,800 B1 | 1/2003 | Amir et al. | |
| 6,535,554 B1 | 3/2003 | Webster et al. | |
| 6,535,716 B1 | 3/2003 | Reichman et al. | |
| 6,567,416 B1 | 5/2003 | Chuah | |
| 6,636,603 B1 * | 10/2003 | Milbrandt | 379/399.01 |
| 6,665,308 B1 * | 12/2003 | Rakib et al. | 370/441 |
| 6,782,277 B1 | 8/2004 | Chen et al. | |
| 6,870,808 B1 | 3/2005 | Liu et al. | |
| 7,023,868 B2 * | 4/2006 | Rabenko et al. | 370/419 |
| 7,050,419 B2 * | 5/2006 | Azenkot et al. | 370/347 |
| 7,120,123 B1 * | 10/2006 | Quigley et al. | 370/252 |
| 2001/0005402 A1 | 6/2001 | Nagatani et al. | |
| 2001/0053132 A1 | 12/2001 | Sala et al. | |
| 2002/0064236 A1 | 5/2002 | Matsuoka et al. | |
| 2002/0073432 A1 * | 6/2002 | Kolze | 725/111 |
| 2002/0154620 A1 * | 10/2002 | Azenkot et al. | 370/347 |
| 2002/0180523 A1 | 12/2002 | Okubo et al. | |
| 2002/0193078 A1 | 12/2002 | Shearer, III et al. | |
| 2003/0020538 A1 | 1/2003 | Kim | |
| 2003/0076894 A1 | 4/2003 | Jin et al. | |
| 2003/0123568 A1 | 7/2003 | Ophir et al. | |
| 2003/0156658 A1 | 8/2003 | Dartois | |
| 2003/0179831 A1 | 9/2003 | Gupta et al. | |
| 2003/0227981 A1 | 12/2003 | Vella-Coleiro et al. | |
| 2004/0013206 A1 | 1/2004 | Gamm et al. | |
| 2004/0021517 A1 | 2/2004 | Irvine et al. | |

FOREIGN PATENT DOCUMENTS

| | | |
|---|---|---|
| JP | 2000115028 | 4/2000 |
| WO | 9428642 | 12/1994 |
| WO | 9507578 | 3/1995 |
| WO | 0072455 A1 | 11/2000 |

OTHER PUBLICATIONS

PCT Search Report dated Oct. 6, 2003 of Patent Application No. PCT/US03/17377 filed Jun. 2, 2003.

PCT Search Report dated Jan. 9, 2004 of Patent Application No. PCT/US03/17449 filed Jun. 2, 2003.

Translation of Japanese Office Action, May 23, 2006, pp. 1-4, Mail No. 200047.

Newton (Newton's Telecom Dictionary), 1998, pp. 230.

Bender, P. et al.; "CDMA/HDR: A Bandwidth Efficient High Speed Wireless Data Service for Nomadic Users", Communications Magazine, IEEE, Jul. 2000, pp. 70-77, vol. 38, Issue 7.

Ostergaard, Rolf V., Cable-Modems.Org The Cable Modem Reference Guide, www.cable-modems.org, May 2003.

* cited by examiner

Downstream Data Format

Upstream Data Format

BANDWIDTH EFFICIENT CABLE NETWORK MODEM

RELATED APPLICATIONS

This application claims the benefit of U.S. Provisional Application No. 60/434,006, filed Dec. 17, 2002. In addition, this application is a continuation-in-part of U.S. application Ser. No. 10/125,241, filed Apr. 18, 2002, now U.S. Pat. No. 7,233,620 which claims the benefit of U.S. Provisional Application No. 60/284,629, filed Apr. 18, 2001. In addition, this application is related to U.S. application Ser. No. 10/529,019, filed Mar. 24, 2005. Each of these applications is herein incorporated in its entirety by reference.

FIELD OF THE INVENTION

The invention relates to telecommunications, and more particularly, to a digital signal demodulator and modulator for cable television and other wired networks where efficient use of allocated frequency bandwidth is desirable.

BACKGROUND OF THE INVENTION

Cable modems transmit and receive digital data over cable television (CATV) networks. These networks were originally installed to transmit television broadcasts. Recently, many CATV networks have been upgraded to provide two-way data communication. Adding cable modems to existing television broadcasting networks makes those networks function like local area computer networks. The original television sets used to receive broadcasts can now be augmented with terminals and modems able to receive and transmit data.

Converting broadcast CATV networks to cable modem networks requires configuring the network for bi-directional communications. Two-way amplification is added to the system so that terminal signals may be transmitted back to the head-end. In addition, scarce bandwidth is allocated for both forward transmissions from the head-end to the terminals, as well as for reverse transmissions from the terminals back to the head-end.

Most CATV networks are hybrid fiber-coax (HFC) networks. The signals run in fiber optical cables from the head-end center to locations near the subscriber. At that point, the signal is converted to coaxial radiofrequency cables, that run to the subscriber terminals. In the bi-directional data network, a cable modem is installed in every user terminal to demodulate and recover received digital transmissions from the head-end (downstream), and to modulate and transmit digital transmissions back to the head-end (upstream). Similarly a cable modem is installed in the head-end to demodulate and recover received digital transmissions from the terminals, and to modulate and transmit digital transmissions back to the terminals.

A typical cable network configuration includes a head-end with a cable modem termination system (CMTS) transmitting data downstream to a terminal network. Approximately two thousand modems can be connected to the CMTS in a tree network configuration per allocated TV channel. If more cable modems are required, the number of TV channels is increased by adding more channels to the CMTS. The physical extent of the network tends to be tens of kilometers or more. This transmission range requires amplification stages, with signal strength varying substantially from terminal to terminal. In the tree configuration, modems communicate directly with the CMTS only. Modem-to-modem communication is done through the CMTS.

Typical cable network signal parameters are summarized in the following table:

|  | Downstream | Upstream |
|---|---|---|
| Data rate | 27-56 Mbit/s | 3 Mbit/s |
| Modulation | 64/256-QAM | QPSK/16-QAM |
| Bandwidth | 6-8 MHz | 2 MHz |
| Carrier frequency | 50-850 MHz | 5-50 MHz |

The downstream channels carry an aggregate of 27 or 56 MBits/s using 64-quadrature amplitude modulated (QAM) or 256 QAM signals, respectively. The total bandwidth allocated to each downstream data transmission channel is 6-8 MHz. The downstream channels are generally placed between 50 and 850 MHz. The upstream channels carry an aggregate of 3 MBits/s using QPSK or 16-QAM. The total bandwidth allocated to each upstream data transmission is 2 MHz. The upstream channels are generally placed between 5 and 50 MHz.

Cable modems are generally connected to computers or special set-top boxes. Computer connection is usually accomplished through an external connector, an internal PCI bus card, or a wireless adapter. Each cable modem in the network transmits bursts in time slots, with each slot marked as reserved, contention, or ranging. Each upstream channel is divided into mini-slots, nominally 16 bytes longs, but can be set up to 128 bytes long by the CMTS. Upstream bandwidth is 200, 400, 800, 1600 or 3200 kHz. A reserved slot is a time slot that is reserved to a particular cable modem, ensuring that no other cable modem transmits during that time. The CMTS allocates the time slots to the various cable modems through a vendor-specific bandwidth allocation algorithm. Reserved slots are normally used for longer data transmissions.

Time slots marked as contention slots are available for transmission by any cable modem. In current systems if two cable modems transmit during the same time slot, the packets collide and the data is lost. The CMTS will signal that no data was received. The cable modems will re-transmit later at other randomly generated times. Contention slots are normally used for very short data transmissions, especially for requests for a number of reserved slots to transmit more data.

The physical distance between the CMTS and the network cable modems causes the time delay to vary substantially. Generally, the delays are on the order of milliseconds. To compensate, cable modems employ a ranging protocol to compensate the clock of the individual cable modem for the delay so that all received transmissions are aligned to the correct frame boundary as they arrive at the CMTS. In U.S. systems, a number of consecutive time-slots are periodically allocated for ranging. In one example, the cable modem is commanded to transmit in the second time-slot. Upon reception, the CMTS transmits a correction value to the cable modem (e.g., a small positive or negative correction value) for its local clock. There is at least one empty time slot before and after the ranging burst to ensure that the ranging burst does not collide with other traffic. The physical distance between the CMTS and the network cable modem also causes varying levels of transmitted signal attenuation among the different modems in the network. The variation in attenuation from the cable modem to the CMTS can vary more than 15 dB. The other purpose of the ranging slot is to align the received amplitudes from all cable modems in the network. For cost-effective demodulation in the CMTS, amplitude alignment is essential for detecting collisions and for minimizing the bit error rate.

In operation, one downstream channel is normally paired with a number of upstream channels to achieve the balance in data bandwidths required. Since the downstream data are received by all cable modems, the total bandwidth is shared between all active modems on the system. Each modem filters out the data it needs from the stream of data. When many modems share the same channel, the effective throughput is lower by a factor of 100 or even 1000. A scheme for multiplexing multiple packets on the same channel would therefore be highly desirable. It would further be desirable to enable the CMTS to receive and recover interfering packets without forcing re-transmission at later times.

What is needed, therefore, are techniques for multiplexing multiple packets on the same channel, and to enable the CMTS to receive and recover interfering packets without forcing re-transmission at later times.

BRIEF SUMMARY OF THE INVENTION

One embodiment of the present invention provides a method for increasing bandwidth efficiency of a cable network including a head end CMTS communicatively coupled to a plurality of cable modems. The method includes determining an attenuation profile associated with a propagation path of the network, so that each cable modem on that path has a known attenuation factor. The method proceeds with assigning two or more MUD enabled cable modems on the path to a same time slot and on a same channel, and transmitting a channel assignment map that reflects the assignments for the modems. Determining an attenuation profile enables, for instance, the CMTS to exploit existing amplitude margin associated with reverse links of the cable network.

In one such embodiment, the plurality of cable modems includes one or more non-MUD enabled modems, and the method further includes assigning each non-MUD enabled cable modem on the path to a unique time slot. Alternatively, the method includes assigning each non-MUD enabled cable modem that is associated with an attenuation factor below an established attenuation factor threshold to a unique time slot. Alternatively or in addition to, the method includes assigning each non-MUD enabled cable modem that is associated with an attenuation factor equal to or above an established attenuation factor threshold to a same time slot and on a same channel as one or more of the MUD enabled modems are assigned.

The attenuation profile is determined, for example, by transmitting test signals of known power levels between the CMTS and each cable modem on the path, thereby allowing the attenuation factor associated with each modem relative to the CMTS to be identified. Alternatively, the attenuation profile is determined based on empirical data. Other techniques for determining the attenuation profile will be apparent in light of this disclosure. The method may further include broadcasting the attenuation profile to each cable modem on the path. Note that the determining, assigning, and transmitting can be carried out, for instance, by a CMTS modem.

The method may further include simultaneously receiving in a same time slot and on a same channel requests from two or more cable modems responding to the transmitted channel assignment map, and recovering each request using co-channel demodulation capabilities. In this particular embodiment, the method may proceed with computing channel assignments based on each request, and transmitting a second channel assignment map, wherein the second map includes a data grant for one or more modems that responded to the first channel assignment map. The method may continue with providing data received from cable modems responding to the second map to corresponding destinations.

Another embodiment of the present invention provides a method for enhancing forward link capacity of a cable network including a CMTS that is communicatively coupled with a plurality of cable modems by a propagation path. The method includes, at a first cable modem, simultaneously receiving multiple signals transmitted in the same time slot and on the same channel, with each signal having a corresponding power level that is sufficiently high relative to a noise floor. The method further includes simultaneously recovering each signal using co-channel demodulation capabilities of the first cable modem, and removing or otherwise ignoring recovered signals not intended for the first cable modem. The removing of recovered signals can be based on, for example, at least one of header information and distinct power levels associated with each recovered signal.

The method may further include, at a second cable modem, simultaneously receiving the multiple signals, with the corresponding power levels of each signal attenuated based on an attenuation profile of the propagation path so that only one of the received signals has a power level that is sufficiently high relative to the noise floor. The method continues with demodulating the one received signal having a power level that is sufficiently high relative to the noise floor using single channel modulation capabilities of the second cable modem, wherein the other attenuated signals are not detectable using single channel modulation capabilities.

In one particular embodiment, the second modem is physically located on or after a point in the propagation path associated with a known attenuation threshold, thereby ensuring non-detectability of the other attenuated signals by the second modem. The one received signal having a power level that is sufficiently high relative to the noise floor can be transmitted at a first power level, and the other attenuated signals can be transmitted at a second, lower power level.

In an alternative embodiment, the method further includes, at a second cable modem, simultaneously receiving the multiple signals, with the corresponding power levels of each signal attenuated based on an attenuation profile of the propagation path so that each signal still has a power level that is sufficiently high relative to the noise floor. Here, the method continues with simultaneously recovering each signal using co-channel demodulation capabilities of the second cable modem, and removing recovered signals not intended for the second cable modem. Each of the signals recovered using co-channel demodulation capabilities of the second cable modem can be transmitted at substantially the same power level.

Another embodiment of the present invention provides a cable modem which enables efficient use of bandwidth in a cable network including a plurality of cable modems. The cable modem includes a multiuser detection module that is adapted to simultaneously demodulate and recover K interfering signals transmitted at the same time on the same channel using co-channel demodulation. A data formatting module is operatively coupled to the multiuser detection module, and is adapted to produce network data packets for at least one of the K recovered signals. A control processor is operatively coupled to the formatting module, and is adapted to exploit existing amplitude margin associated with one or more propagation paths of the cable network by deliberately scheduling interfering transmissions based on known attenuation characteristics of the one or more propagation paths. In response to the control processor knowing that a modem with which it is communicating is not MUD enabled, the control processor may further be adapted to enable a legacy protocol mode thereby providing backwards compatibility.

In one particular embodiment, the network includes a propagation path having both MUD enabled and non-MUD enabled modems, and the control processor is adapted to assign each non-MUD enabled cable modem that is associated with an attenuation factor below an established attenuation factor threshold to a unique time slot, thereby enabling a legacy protocol mode. Alternatively or in addition to, the control processor can be further adapted to assign each non-MUD enabled cable modem that is associated with an attenuation factor equal to or above an established attenuation factor threshold to a same time slot and on a same channel as one or more of the MUD enabled modems are assigned.

The control processor may include, for example, a data format interface module configured for bidirectional communication, and adapted to interface the control processor with the data formatting module. A data format selector module is configured to allow selection of one or more data format modes in which the data formatting module is capable of operating. The data format interface module may be further configured to remove recovered signals not intended for the cable modem. In another such embodiment, the control processor includes a digital signal level detector module configured to detect the signal level of recovered signals, and an attenuation profile module configured to compute and store attenuation factors associated with other modems of the network. The attenuation profile module may be further configured to compare received signal levels of actual user signals to known attenuation factors to determine which modem in the network sent the signal.

In one particular embodiment, the cable modem includes a modulator, and the control processor further includes a channel assignment module configured to provide data and corresponding time slot and channel assignments based on the known attenuation characteristics to the modulator. The data formatting module may support multiple types of format modes, and the control processor can be further configured to select a formatting mode in which the data formatting module operates.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention provide a digital signal demodulator/modulator for cable and other wired networks where efficient use of allocated frequency bandwidth is desirable. In one particular embodiment, a cable modem is provided that is adapted to multiplex multiple packets on the same channel, and to enable the CMTS to receive and recover interfering packets without forcing re-transmission at later times. Example applications include cable television systems transmitting data between the head-end and terminals according to North American or European standards. The modem includes functions necessary to maintain interoperability with existing network devices. Before describing embodiments of the present invention, some background information on cable networks and configurations is provided in reference to FIGS. 5-9.

Cable Networks and Configurations

Figure 5:
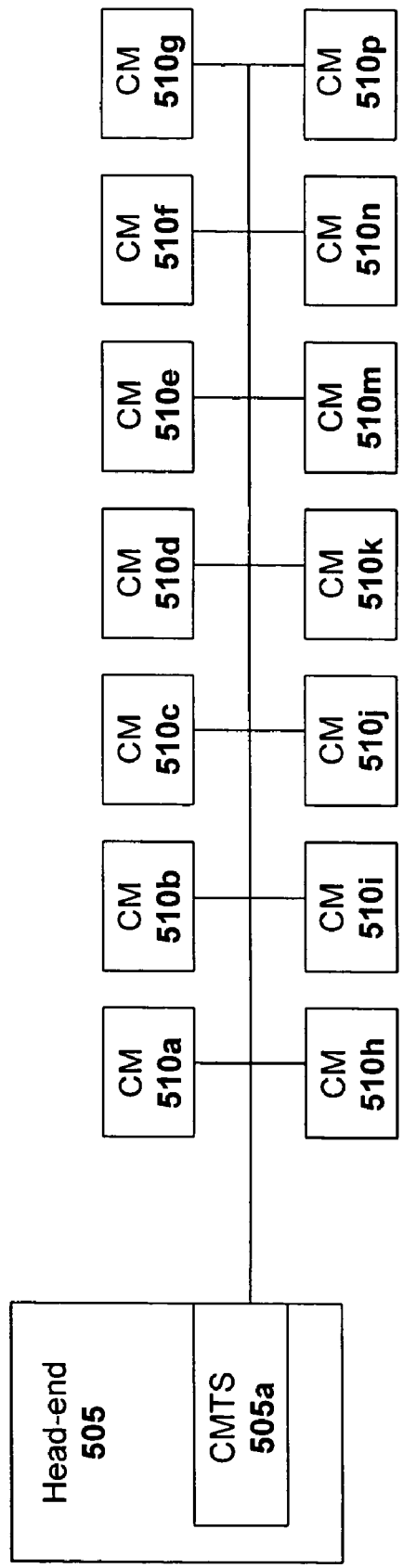
FIG. 5 illustrates a typical cable network architecture.

FIG. 5 shows an example cable network configuration consisting of a head-end 505 with a cable modem termination system (CMTS) 505a transmitting data to a terminal network that includes a number of cable modems (CM) 510a-p. In a typical network, about two thousand cable modems 510 are connected to the CMTS in a tree network configuration per allocated TV channel. If more cable modems are required, the number of TV channels is increased by adding more channels to the CMTS. The physical range of the network tends to be tens of kilometers or more. This transmission range requires amplification stages, with signal strength varying substantially from terminal to terminal. In the tree configuration, cable modems 510 communicate directly with the CMTS 505a only. Modem-to-modem communication is accomplished by indirection through the CMTS 505a.

Figure 6:
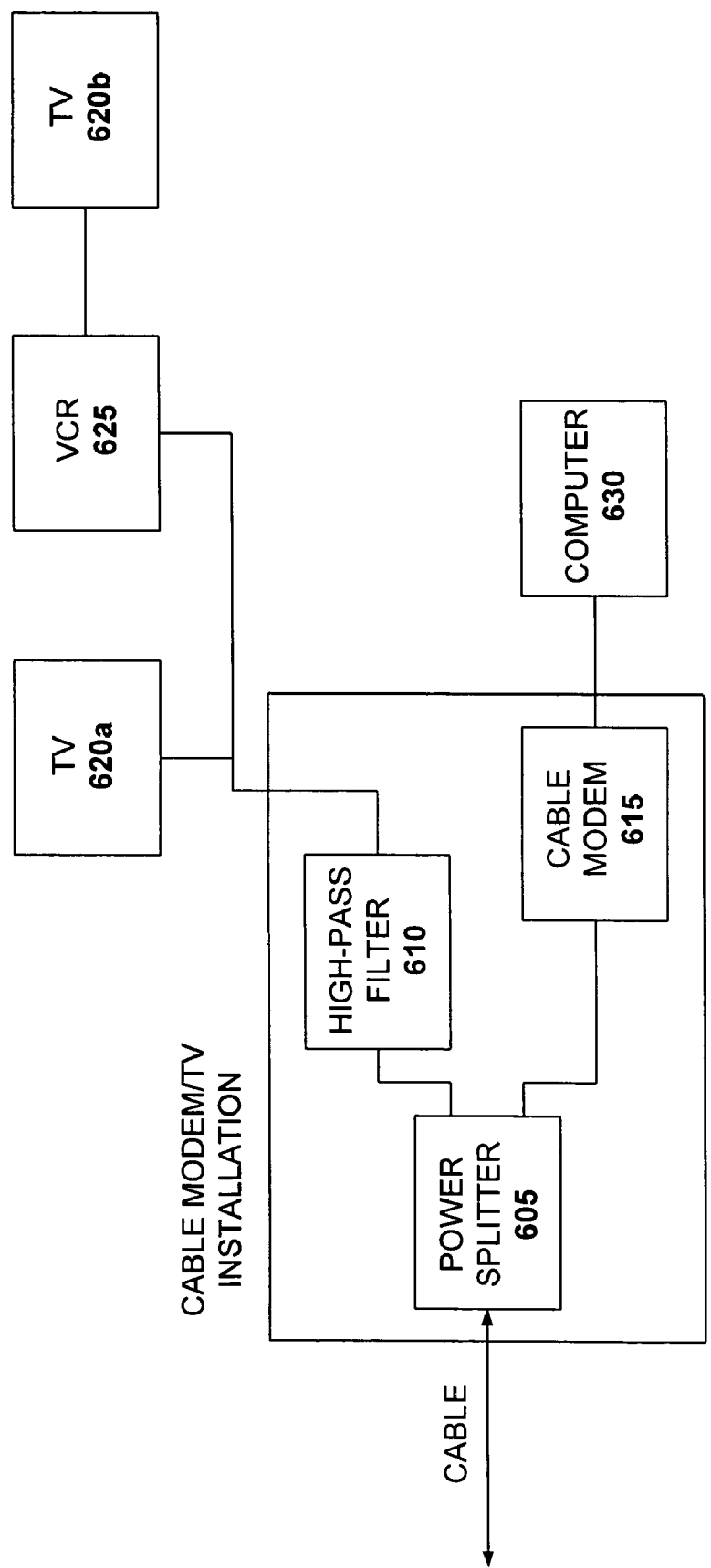
FIG. 6 illustrates a typical cable modem installation.

Cable modems are generally connected to computers or special set-top boxes. Computer connection is typically accomplished through an external connector or an internal PCI bus card. FIG. 6 shows an example installation. In most cases, the cable modem 615 is added to a cable line already serving a television set or related device (e.g., VCR). In this case, a power splitter 605 and a new cable are usually required. The power splitter 605 divides the received signal among the legacy television equipment (e.g., televisions 620a-b and VCR 625) and the new cable segment that connects the cable modem 615. The television equipment does not use the new cable that connects to the cable modem 615.

A high-pass filter 610 isolates low frequency non-television signals from the television equipment cable segment so that the television equipment is not jammed or otherwise interfered with when the cable modem 615 transmits packet bursts. Thus, high-pass filter 610 allows only TV-channel frequencies to pass, and blocks the upstream frequency band transmitted by the cable modem 615. Another reason for the filter 615 is to block noise transmission in the low upstream frequency range from the in-house wiring. Noise injected at each of several thousand individual residences (or other terminal locations) will accumulate in the upstream path towards the head-end 505.

Figure 7:
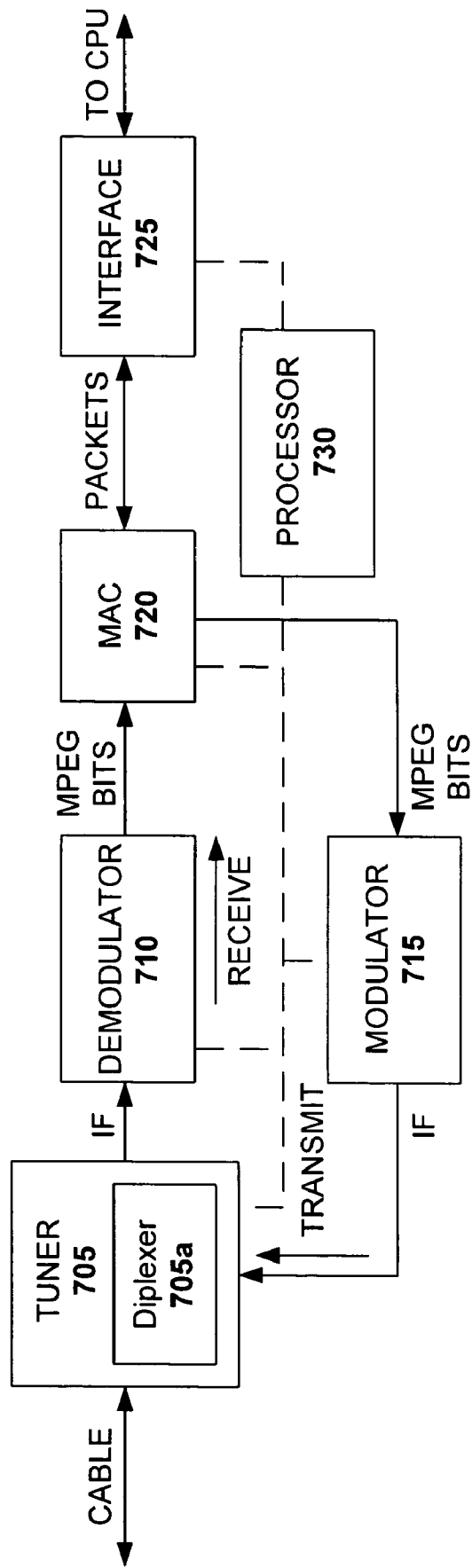
FIG. 7 illustrates a block diagram of a typical cable modem.

FIG. 7 illustrates general cable modem internal architecture, which includes a tuner 705, a demodulator 710, a modulator 715, a media access controller (MAC) 720, and an interface 725. The tuner 705 selects a television channel and converts the received signal to a fixed intermediate frequency (IF). The demodulator 710 samples the intermediate frequency data, demodulates, error corrects, and synchronizes MPEG frames. The MAC 720 extracts data from the MPEG frames, blocks data intended for other cable modems, executes the protocols, and initiates upstream transmission bursts. On the transmission side, the burst modulator 715 performs encoding (e.g., Reed-Solomon), digital modulation, D/A conversion and upconversion to a fixed IF. The tuner 705 upconverts the fixed IF and transmits the burst.

The tuner 705 connects directly to the CATV outlet. The tuner 705 contains a diplexer 705a which enables communication of both upstream signals (e.g., via a high-pass filter) and downstream signals (e.g., via a low-pass filter) through the same device. Alternatively, the diplexer 705a can be external to the tuner 705. The tuner 705 is of sufficiently good quality to receive digitally modulated (e.g., QAM) signals without distorting them to the extent where demodulation is impossible.

In the receive direction, the IF signal output by the tuner 705 is provided to a demodulator 710. In one particular application, the demodulator 710 is configured with an A/D converter, a QAM-64/256 demodulator, MPEG frame synchronization, and Reed Solomon error correction. The downstream modulation is usually 64-QAM with 6 bits per symbol (normal), but can also be 256-QAM with 8 bits per symbol (faster, but more sensitive to noise).

In the transmit direction, the output of the burst modulator 715 is applied to the tuner 705. In one particular application, the burst modulator 715 performs Reed Solomon encoding on each burst, digitally modulates the data into a QPSK/QAM-16 waveform on the selected frequency using a waveform generator, and is configured with a D/A converter that converts the modulated data to an analog output signal. The output signal can be applied to a line driver with a variable output level, so the signal level can be adjusted to compensate for the unknown cable loss.

The MAC processor 720 is operatively coupled between the receive and transmit paths of the modem. This programmable device is configured to discard packets addressed to other modems, and to process the packet data for this modem in accordance with DOCSIS (Data Over Cable Service Interface Specification) or other cable protocols. The data that is received by the modem from the cable and accepted through the MAC processor 720 is applied to the computer interface 725. In the transmit direction, data is received from the interface 725, processed through the MAC 725, and provided to modulator 715 for transmission onto the cable via the tuner 705.

An external cable modem will also require a processor 730 to provide overall control. Note, however, that internal cable modems are generally controlled by the CPU of the host computer through the computer bus.

The raw data-rate depends on the modulation and bandwidth as shown below:

|  | 64-QAM | 256-QAM |
| --- | --- | --- |
| 6 MHz | 31.2 Mbit/s | 41.6 Mbit/s |
| 8 MHz | 41.4 Mbit/s | 55.2 Mbit/s |

A symbol rate of 6.9 Msym/s is used for the 8 MHz bandwidth, and 5.2 Msym/s is used for the 6 MHz bandwidth in the above calculations. Raw bit-rate is somewhat higher than the effective data-rate due to error-correction, framing and other overhead. Forward error correction is performed, for example, according to ITU-T J.83B for U.S. systems. Interleaving is used to mitigate burst errors—95 microseconds protection at cost of 4 milliseconds latency.

Figure 8:
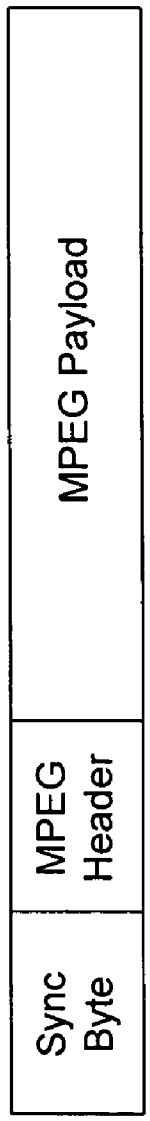
FIG. 8 illustrates the format of data frames for the forward link.

An example forward link or downstream packet format is shown in FIG. 8. In U.S. systems, forward link data is framed according to the MPEG-TS (transport stream) specification. A 188/204 byte block format is used with an eight-bit synchronization byte in front of each block. The Reed-Solomon error correction algorithm reduces the block size from 204 bytes to 188 bytes, leaving 187 for MPEG header and payload. This particular format corrects six errors in 204 bytes.

It will be appreciated that, at this level, the network standards vary. Some standards permit variable data formats within the MPEG-TS payload. For the DVB/DAVIC standard, for example, the framing inside the MPEG-TS payload is a stream of ATM cells. The packets are addressed to one, many, or all cable modems included in a given network. Cable modem packets have a program identifier (e.g., 0×1FFE) in the MPEG header.

Figure 9:
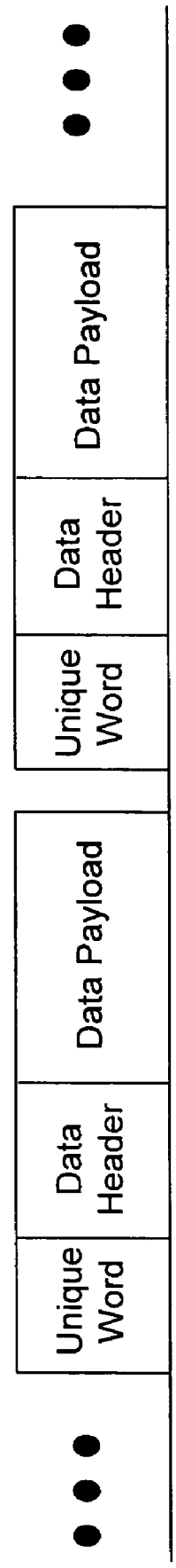
FIG. 9 illustrates the format of data frames for the reverse link.

As shown in FIG. 9, reverse link or upstream data is arranged in short bursts. The DAVIC/DVB standard requires a fixed length burst, whereas the MCNS standard specifies variable length bursts. Each packet begins with a "unique word" used to synchronize the CMTS demodulator with the received data packets. Generally, the synchronization word is about 32 bits. Reed-Solomon error correction is used by most standards, but other error correction techniques can be used as well. In DVB/DAVIC, there is one ATM cell per burst. The payload consists of a MAC message or data. In DVB/DAVIC, the channelization is time slots per 3 milliseconds. Longer data is transmitted in reserved time slots. Small data is transmitted during contention time slots.

There are four layers to DOCSIS. The physical layer was previously discussed in terms of modulation definitions and coaxial media. The MPEG-2 transmission convergence layer was also discussed in terms of encapsulating cable modem data within 188-byte MPEG-2 frames. The media access control layer controls cable modem access to the return path. The CMTS tells the cable modems when to transmit and for how long, thereby controlling access to return path using a request/grant mechanism. Using this type of protocol, a cable modem requests from the CMTS an opportunity to transmit a certain amount of data.

As the CMTS receives requests from all the modems with data to transmit, it reserves mini-slots, or transmission opportunities on the return path accordingly. Periodically every few milliseconds, the CMTS sends a message to the cable modems over the forward link path indicating the specific mini-slots granted to each modem. As a result of reserving bandwidth, modems are guaranteed a collision-free interval in which to transmit. The CMTS is responsible for allocating bandwidth to modems based on the types of service provided to the particular end user.

In order for a modem to request bandwidth without first having been allocated a time to send a request message, the CMTS periodically allocates a portion of the return channel for any modem to send a request during the contention period. These requests may collide with a request from another modem. However, the CMTS can vary both the length and frequency of the contention request intervals to keep the number of collisions to a minimum. If a collision is detected, the cable modems that sent the messages will be notified by the CMTS, and will back off random intervals and then retransmit their requests.

The highest DOCSIS layer is the security layer. Future systems may offer advanced physical layers. Possibilities include frequency-agile TDMA, synchronous CDMA and orthogonal FDM modulation. Services will also advance including things like streaming services like voice over IP.

Bandwidth Efficient Cable Modem

Figure 1:
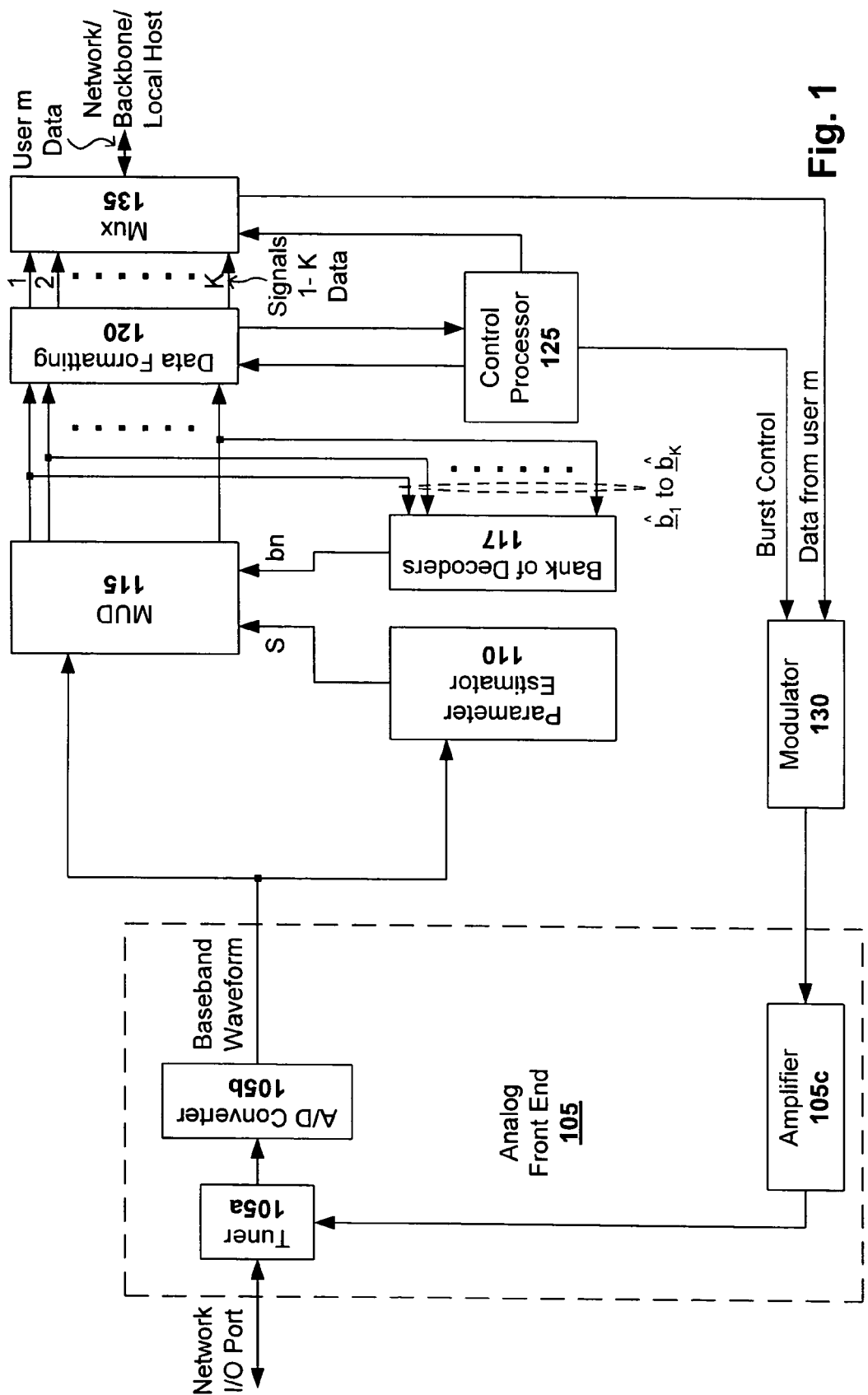
FIG. 1 is a block diagram of a cable modem configured in accordance with one embodiment of the present invention.

FIG. 1 illustrates a block diagram of an cable modem configured for transmitting as well as simultaneously demodulating interfering digital signals on the same channel in accordance with one embodiment of the present invention. The modem includes an analog front end 105, a parameter estimator module 110, a multiuser detection (MUD) module 115, a bank of decoders 117, a data formatting module 120, a control processor 125, a modulator 130, and a demultiplexer 135. The analog front end includes a network I/O port coupled to a tuner 105a and an analog-to-digital (A/D) converter 105b, and an amplifier 105c.

On the receiver side, signals are received via the cable at the network I/O port, processed through the analog front end 105, demodulated/recovered by modules 110, 115, and 117, and formatted by data formatting module 120. The resulting data signals 1-K are then provided to demultiplexer 135, which is adapted to select data signal m, the signal of interest (one of the data signals 1-K). This selected signal m is then provided to user m, for example, via a network or direct connections. The data formatting module 120 and the demultiplexer 135 operate pursuant to control input from the control processor 125. For instance, conventional formatting or decoding carried out by the data formatting module 120 can be controlled and or monitored by the control processor 125. The control processor 125 can further control which signals recovered by the MUD module 115 are operated on by the data formatting module 120, and which of the recovered signals are to be removed or otherwise ignored by the module 120.

On the transmitter side, the demultiplexer 135 receives transmission data m from the network/backbone or local host using a bidirectional line from user m. The data is modulated by module 130 in accordance with burst control provided by the control processor 125, amplified by amplifier 105c, and provided to the network I/O port via the tuner 105a for transmission. In general, the control processor 125 controls the flow of data out of the modulator 130, thereby controlling when the modem transmits, and when the modem does not transmit for user m. A legacy transmission mode is supported also thereby providing backwards compatibility if the remote modem with which this modem is communicating is not configured to operate in accordance with the principles of the present invention.

RF Receiver—MUD Enabled

The signals from the cable are coupled to the tuner 105a via the network I/O port. The tuner 105a converts the signals in the appropriate channel to baseband or other relatively low frequency signals prior to processing. At baseband, the A/D converter 105b digitizes the received signal into a sampled data stream. Filtering, amplification, and other conventional processing, may also be implemented in the analog front end 105.

The sampled data streams are provided as inputs to the parameter estimation module 110, which is a synchronization device for interfering digital signals. The parameter estimation module 110 estimates the relative received timing offsets, phases, received amplitudes, and multipath structure for each of the interfering signals present in the received signal. The result of such parameter estimation is a matrix (S) of estimated composite signature waveforms for each of K signals, which is used by the MUD module 115 to help separate the channel signals.

The MUD module 115 uses the S matrix of estimated composite signature waveforms in addition to input from the A/D converter 105b to recover the data bits from the interfering signals as is conventionally done. The MUD module 115 supplies the recovered data bits as inputs to the formatting module 120, which operates as a buffering device and produces data packets for each of the K interfering transmissions. The packet format depends on factors such as the given application and protocols being used by the communicating modems.

Note that the MUD module 115 is operatively coupled to a bank of decoders (1-K) 117, with each decoder communicatively coupled to a corresponding output of the MUD module 115. The bank of decoders receives a recovered symbol stream ($\underline{b}1$ to $\underline{b}K$) for each of the K signals output by the MUD module 115, and provides error correction for each user by converting symbols to bits, comparing present bits to prior bits and/or subsequent bits, and then converting the bits back to symbols. Any number of various decoding algorithms can be employed here, such as Soft Viterbi or BCJR decoding. The result of such conventional error correction is a matrix $(b(n))$ of symbol estimates which are used by the MUD module 115 in the iterative process to provide better estimates of the particular symbols.

The iterative demodulation process carried out by modules 110, 115, and 117 for each of the K signals can be continued, for example, until a specified number of iterations is reached or until the difference between the compensated symbol estimates for the current and previous iterations are below a predefined threshold.

Each of the analog front end 105, parameter estimation module 110, MUD module 115, and bank of decoders 117 can be implemented in conventional technology. However, variations are also possible. For example, the parameter estimator 117 can be configured as described in U.S. patent application Ser. No. 10/228,787, titled, "Parameter Estimator for a Multiuser Detection Receiver." The MUD module 115 can be configured to operate as an MMSE MUD with prior information about the symbols as described in U.S. application Ser. No. 10/105,918, titled "System for Decreasing Processing Time in an Iterative Multi-User Detector System." Each of these applications is herein incorporated by reference in its entirety.

The data formatting module 120 can also be implemented in conventional technology, but may be further adapted to operate in conjunction with the control processor 125. In particular, control processor 125 may be configured to select the formatting mode in which the data formatting module 120 operates. The formatting mode will depend on the network or local host (e.g., ATM, PSTN, ISDN, personal computer) to which the modem is feeding the received data streams. The data formatter module 120 can be configured to support multiple types of format modes.

The recovered data signals 1-K are output by the data formatting module 120, and provided to the demultiplexer 135, which selects the intended signal m based on input provided by the control processor 125. In one example embodiment, the control processor 125 receives packet header information for each of the received signals 1-K from the data formatting module 120. The packet header information of a data signal includes, among other information, the intended destination of that data signal. As such, the data signal intended for a particular modem can be identified, while the other received data signals can be ignored. Thus, the control processor 125 interrogates header information, and provides a control signal to the demultiplexer 135 that allows only the intended data signal m to be passed. In addition, the control processor 125 uses the packet headers of the interfering modems to determine which modems are sharing the channel. The source and destination addresses of the packet headers allow the control processor 125 to maintain logs of which modems are able to successfully transmit and receive data simultaneously. These logs facilitate adaptive scheduling techniques.

Alternatively or in addition, the control processor 125 can be configured to establish a threshold for signal power based on an attenuation profile received from the CMTS, where every recovered signal received by the data formatting module 120 that does not exceed that threshold is effectively ignored. Note that the functionality of the multiplexer 135 and the data formatting module 120 can be integrated into one module, or even into the control processor module 125. The control processor 125 enables the corresponding transmission mode (e.g., legacy mode or bandwidth efficient mode in accordance with the present invention).

RF Transmitter

Data m is provided from the network/backbone or local host for user m to the demultiplexer 135, which buffers the outgoing data in preparation for providing it to the modulator 130, which operates under the control of the control processor 125. A number of access schemes (e.g., FDMA, TDMA, CDMA) and modulations (e.g., binary phase shift key, quadrature phase shift key, direct sequence spread spectrum, quadrature amplitude modulation, orthogonal frequency division multiplexing and pulse position modulation), can be implemented by the modulator 130. Transmission time is triggered by the burst control of control processor 125. The functionality of the control processor 125 will be discussed in reference to FIGS. 2-4. This control processor 125 can be implemented, for example, with a set of software instructions executing on a microprocessor, a digital signal processor, or other suitable processing environment. Alternatively, the control processor 125 can be implemented in special purpose built silicon (e.g., ASIC or FPGA).

Bandwidth Efficient Protocol—Upstream

Figure 2:
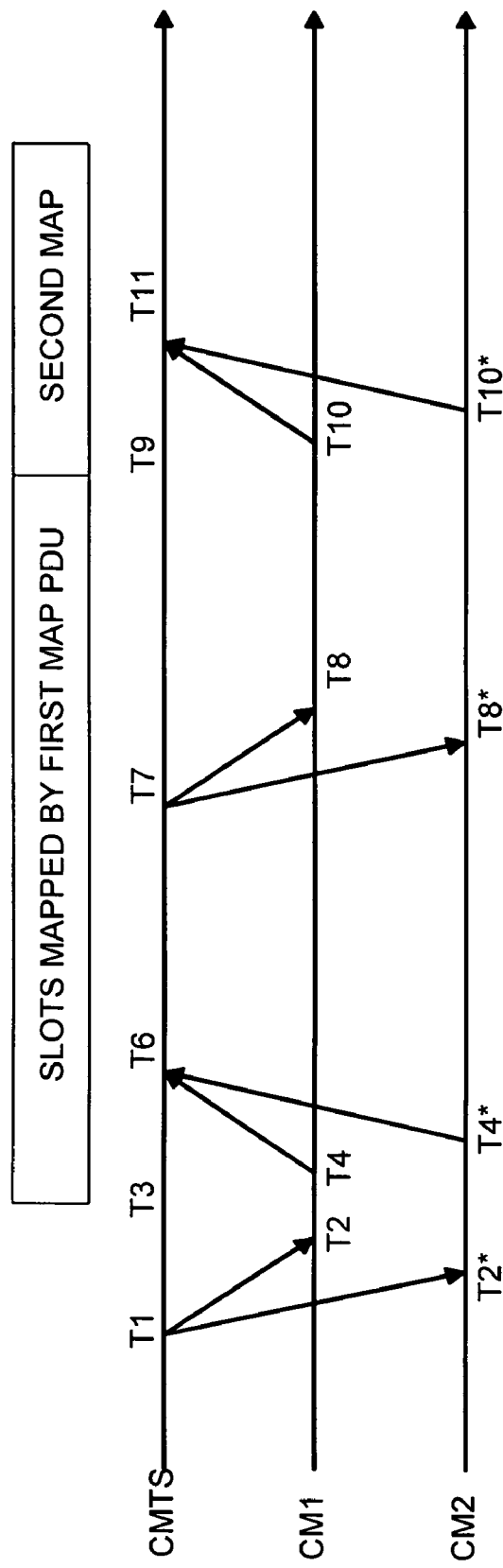
FIG. 2 illustrates an enhanced capacity reverse link protocol in accordance with one embodiment of the present invention.

FIG. 2 shows a timing diagram for the enhanced capacity reverse link protocol in accordance with one embodiment of the present invention. In this example, the CMTS contains a MUD demodulator enabling simultaneous recovery of interfering signals. In this sense, the CMTS is MUD enabled as described in reference to FIG. 1.

At time T1, the CMTS transmits a first channel assignment map whose effective starting time is T3. At later time T2, cable modem 1 (CM1) receives the message from the CMTS. At a different time T2* owing to propagation delay, cable modem 2 (CM2) receives the same message. Both cable modems CM1 and CM2 scan the first map for channel request opportunities. In order to minimize request collisions, both modems calculate T6 as a random offset based on the Data Backoff Start value in the first map, which is the most recent map. Other basis for generating a random offset may also be used here. Through a random accident, both CM1 and CM2 calculate the same value for T6.

At time T4, CM1 transmits a request for as many mini-slots as needed to accommodate the packet data it wishes to transmit. Time T4 is chosen based on the ranging offset so that the request will arrive at the CMTS at T6. Similarly, CM2 calculates time T4* based on its ranging offset and transmits its request, arriving simultaneously at the CMTS at T6.

At T6, the CMTS receives the colliding requests. In the case of the CMTS utilizing a conventional digital demodulator, the received data would be unintelligible resulting in a failure to acknowledge the request. Both modems CM1 and CM2 would have to wait until the end of the transmission of the next map, note that they failed to obtain data grants, and re-attempt access. This process causes system throughput degradation in the case of congested networks. However, if the CMTS contains a MUD demodulator (i.e., MUD enabled), then it recovers both packets simultaneously, decodes the requests, and computes channel assignments.

At time T7, the CMTS transmits a second map whose effective starting time is T9. Within this second map, a data grant for both CM1 and CM2 will start at T11. By successfully demodulating the colliding packets transmitted by CM1 and CM2, the CMTS has determined that both modems can successfully transmit at the same time, thereby saving a channel that would otherwise have to be allocated separately for CM2. In this sense, bandwidth efficiency is achieved.

At times T8 and T8* respectively, CM1 and CM2 each receive the second map and scan for the data grants. At times T10 and T10* respectively, CM1 and CM2 each transmit data in the same time slot and on the same channel so that the packets arrive simultaneously at the CMTS at T11. Times T10 and T10* are calculated from the ranging offsets as previously described.

The effectiveness of this technique depends on the propagation environment in the cable network. In cases with strong signal levels and low noise levels, it will be possible to extend the method to accommodate triple collisions. It would also be possible to schedule transmission by three or even more modems on the same carrier frequency in the same time slot. The co-channel demodulator in the CMTS will resolve the interfering data given sufficient margin. Conversely, in noisy cases such as where both transmissions transmit the entire length of cable, it may be necessary to maintain separate channels for each communicator.

Bandwidth Efficient Protocol—Downstream

Figure 3A:
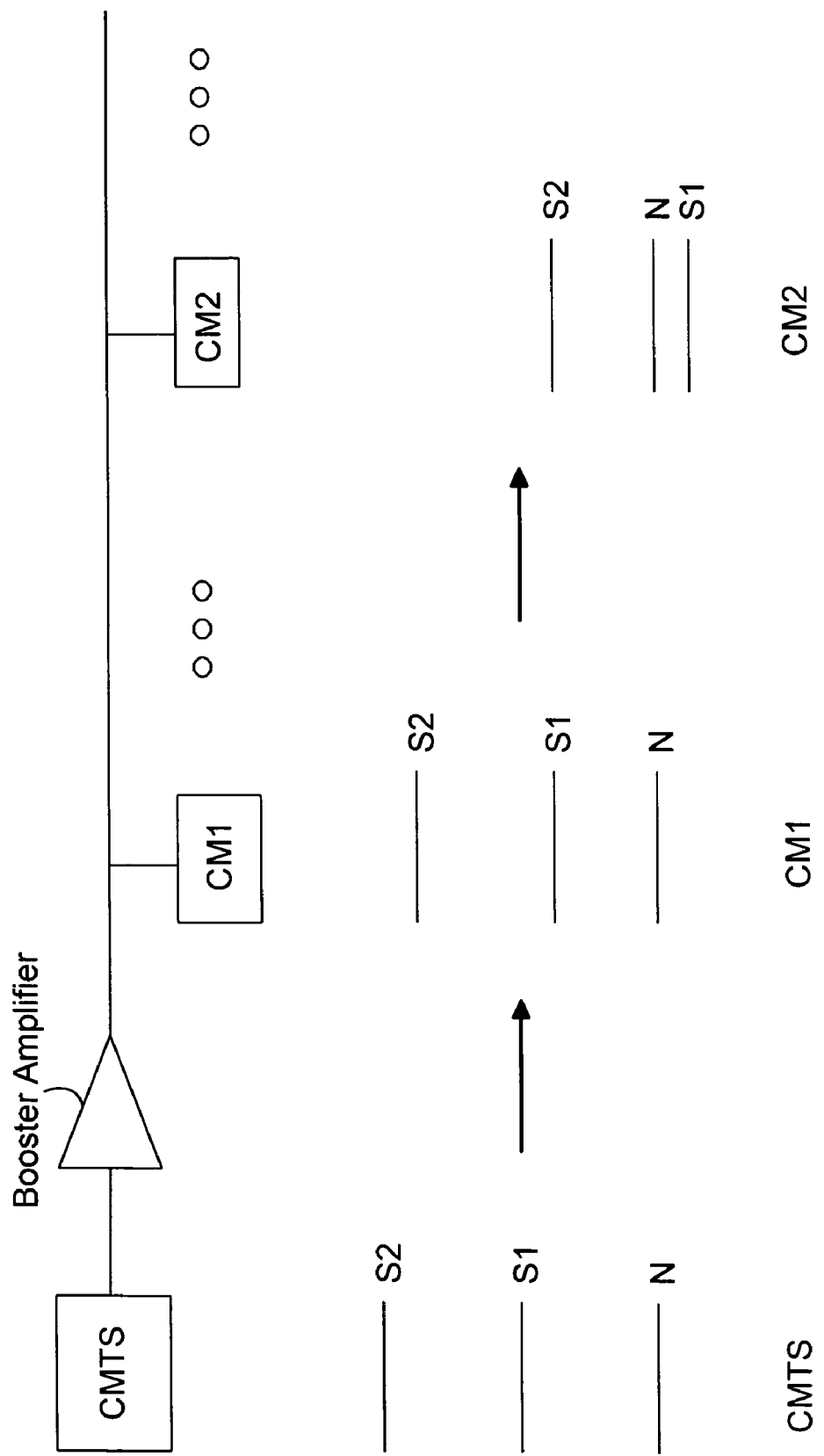
FIG. 3a illustrates a time-slot stealing technique for enhanced forward link capacity in accordance with one embodiment of the present invention.

FIG. 3a shows the time-slot stealing technique for enhanced forward link capacity in accordance with one embodiment of the present invention. In this particular case, one modem in the propagation path has a co-channel demodulator (MUD enabled) and the other modem in the propagation path is a legacy type modem, and not configured in accordance with the principles of the present invention.

In general, signal-to-noise environments vary greatly due to propagation losses as the forward signal propagates from the previous booster amplifier. Thus, it is possible to allocate special MUD enabled cable modems configured in accordance with embodiments of the present invention to terminals located near the booster amplifiers. In this case, data may be transmitted to these special modems without affecting other modems sharing the same channel in frequency and time slot, but at greater distances from the booster amplifier.

The first panel shows the signal levels transmitted at the CMTS. The power level of signal S2 intended for CM2 is many dB (e.g., 3 dB or more) above the noise floor N so as to provide sufficient margin for propagation losses. It is possible to transmit a simultaneous packet intended for another cable modem 1 (CM1) equipped with a co-channel demodulator provided that it is located sufficiently close to the booster amplifier to still have ample margin above the noise floor N for demodulation.

The second panel shows the signal levels received by CM1. As can be seen, signal S2 comes in at a relatively strong power level. However, signal S2 can be distinguished by the co-channel demodulator of CM1 provided that signal S1 and S2 remain sufficiently high above the noise floor N. Both signal levels can be seen to be attenuated due to propagation losses between the CMTS and CM1, but the intervening booster amplifier allowed the signal levels to remain sufficiently above (e.g., 3 dB or more) the noise floor N.

The third panel shows the signal levels received by CM2. At this point, propagation losses have attenuated signal S1 to the point where it is now buried below the noise floor N. The extra packets inserted for CM1 are now too weak to affect the performance of the conventional demodulator in CM2. In this sense, the network has borrowed or "stolen" the time slot assigned to CM2 in order to also transmit data to CM1 without affecting CM2. The extra capacity is provided transparent to legacy terminals operating in the network.

The effectiveness of this technique depends on the propagation environment in the cable network. Performance data (e.g., attenuation profiles for each propagation path of network) can be measured over time, and then stored (e.g., locally in each modem or remotely in a central storage communicatively coupled to the network). Thus, data can be transmitted in borrowed time slots of a particular channel when the legacy modems associated with that particular channel are far enough away that the known attenuation will effectively eliminate the potentially interfering signals. In this sense, modems physically located on or after a point in the propagation path associated with a known attenuation threshold can be legacy modems, and not be affected by the time slot borrowing technique described herein.

In cases with strong signal levels and low noise levels, it will be possible to extend the method to accommodate three or more simultaneous transmissions. It would also be possible to schedule transmission to three or even more modems on the same carrier frequency in the same time slot. All the modems prior to the known attenuation threshold point in the propagation path must be equipped with a co-channel demodulator to resolve the data. Modems after that known attenuation point could either be MUD enabled modems or legacy modems. Conversely, in noisy cases such as where both transmissions transmit the entire length of cable, it may be necessary to maintain separate channels for each communicator.

Figure 3B:
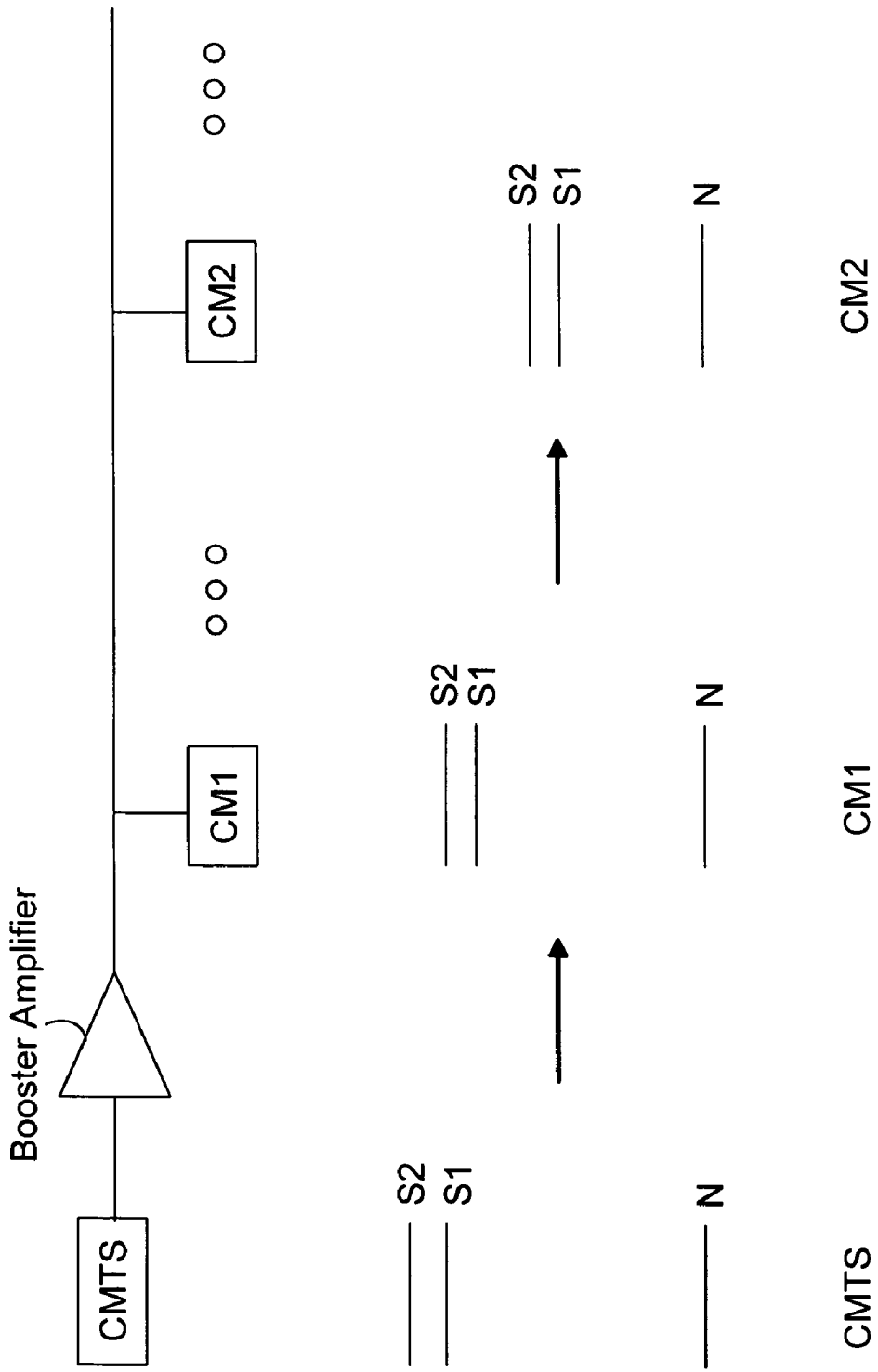
FIG. 3b illustrates a time-slot stealing technique for enhanced forward link capacity in accordance with another embodiment of the present invention.

FIG. 3b shows the time-slot stealing technique for enhanced forward link capacity in accordance with another embodiment of the present invention. In this particular case, both modems CM1 and CM2 have co-channel demodulators, and are therefore MUD enabled.

As previously discussed, it is possible to allocate special MUD enabled cable modems configured in accordance with embodiments of the present invention to terminals located near booster amplifiers. In this case, data may be transmitted to these special modems without affecting other modems at greater distances from the booster amplifier, while sharing the same channel in frequency and time slot.

The first panel shows the signal levels transmitted at the CMTS. As can be seen, the power level of signal S1 intended for CM1 is many dB (e.g., 3 dB or more) above the noise floor N to provide sufficient margin for propagation losses. Likewise, it is possible to transmit a simultaneous packet, signal S2, intended for another modem CM2 provided that signal S2 also has ample margin above the noise floor N for demodulation.

The second panel shows the signal levels received by CM1. S2 comes in at a relatively strong power level. However, it can be distinguished by the co-channel demodulator provided that S1 and S2 remain sufficiently high (e.g., 3 dB or more) above the noise floor N. Both signal levels of S1 and S2 can be seen to be attenuated due to propagation losses between the CMTS and CM1.

The third panel shows the signal levels received by CM2. Propagation losses have further attenuated both signals S1 and S2. However, sufficient margin still exists for co-channel demodulation. The extra capacity is provided transparent to legacy terminals operating in the network because both modems with co-channel demodulators are assigned to the same slot. Through use of ranging data, the CMTS is able to track the propagation environment for each modem in the network, and an attenuation profile can thus be provided for each communication link (e.g., between the CMTS and a particular cable modem). This information enables use of adaptive channel scheduling as explained herein for optimal network utilization.

The effectiveness of this technique depends on the propagation environment in the cable network. In cases with strong signal levels and low noise levels, it will be possible to extend the method to accommodate three or more simultaneous transmissions. It would also be possible to schedule transmission to three or even more modems on the same carrier frequency in the same time slot. Using this particular technique, each modem in a propagation path of the cable network must be equipped with a co-channel demodulator to resolve the data because each transmitted signal is transmitted at roughly the same power level. Conversely, in noisy cases such as where both transmissions transmit the entire length of cable, it may be necessary to maintain separate channels for each communicator.

This technique can provide services in more cases than the co-channel plus legacy technique described in FIG. 3a because extra margin or distance is not required between signals S1 and S2 to allow the co-channel modem signal to decay below the noise floor.

Note that the MUD enabled CMTS makes co-channel assignments whether the modem requests actually interfere or not. The MUD enabled CMTS deliberately schedules interfering transmission based on received amplitude data from the cable modems of the network. In this sense, a MUD enabled CMTS exploits amplitude margin wherever it exists on the reverse link.

Methodology—Upstream

Figure 4A:
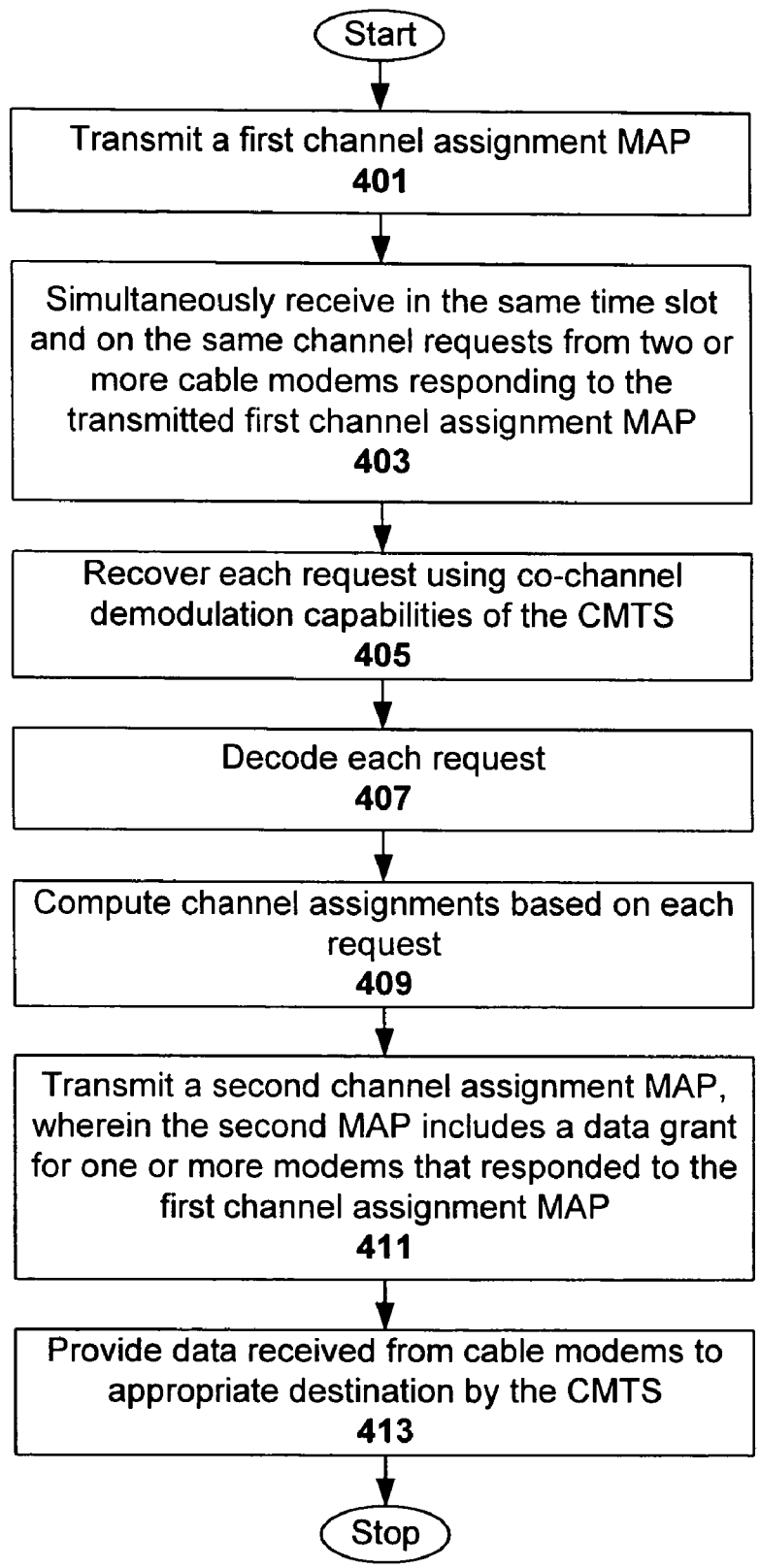
FIG. 4a illustrates a method for enhancing reverse link capacity of a cable network in accordance with one embodiment of the present invention.

FIG. 4a illustrates a method for enhancing reverse link (upstream) capacity of a cable network in accordance with one embodiment of the present invention. The method may be carried out, for example, by a MUD enabled CMTS configured as discussed in reference to FIG. 1.

The method begins with transmitting 401 a first channel assignment map. Each cable modem included in the downstream network will receive the map at various times, depending on the propagation delay associated with that cable modem relative to the CMTS. These downstream cable modems can scan the first map for channel request opportunities, and may calculate a random offset to minimize request collisions. The cable modems may then transmit their respective requests for time slots needed to transmit their data.

The method continues with simultaneously receiving 403 in the same time slot and on the same channel requests from cable modems responding to the transmitted first channel assignment map, and recovering 405 each request using co-channel demodulation capabilities of the CMTS. The method then proceeds with decoding 407 each request, and computing 409 channel assignments based on each request.

The method may then proceed with transmitting 411 a second channel assignment map, wherein the second map includes a data grant for one or more modems that responded to the first channel assignment map. Thus, by successfully demodulating the colliding requests transmitted by downstream modems, the CMTS has determined that two or more of the modems can successfully transmit in the same time slot and on the same channel, thereby saving channels that would otherwise have to be allocated separately for each of the responding modems. The respective downstream modems can then each receive the transmitted second map and scan for the data grants, and transmit data in the same time slot and on the same channel so that the packets arrive simultaneously at the CMTS.

The method may further include providing 413 data received from cable modems to appropriate destination by the CMTS. In addition, the method may further include repeating the receiving, recovering, decoding, computing (if appropriate), and providing (if appropriate) steps for any subsequent simultaneously received responses from downstream cable modems.

In one embodiment, the transmitting, decoding, computing, and providing steps (401, 407, 409, 411, and 413) can be carried out or otherwise controlled by the control processor (125) of the cable modem in FIG. 1, while the receiving and recovering steps (403, and 405) can be carried out by the MUD module (115). The data formatting module 120 can be programmed so that it is responsive to control by the control processor as previously explained. Thus, formatting and decoding modes can be dictated by the control processor 125, as well as what recovered signals are processed or ignored. Variations on this example embodiment, as well as the supporting roles of the front end (105), modulator (130), and other componentry (e.g., 110, 117) will be apparent in light of this disclosure. For example, note that the functionality of the data formatting module 120 and the control processor 125 can be integrated into a single module.

Methodology—Downstream

Figure 4B:
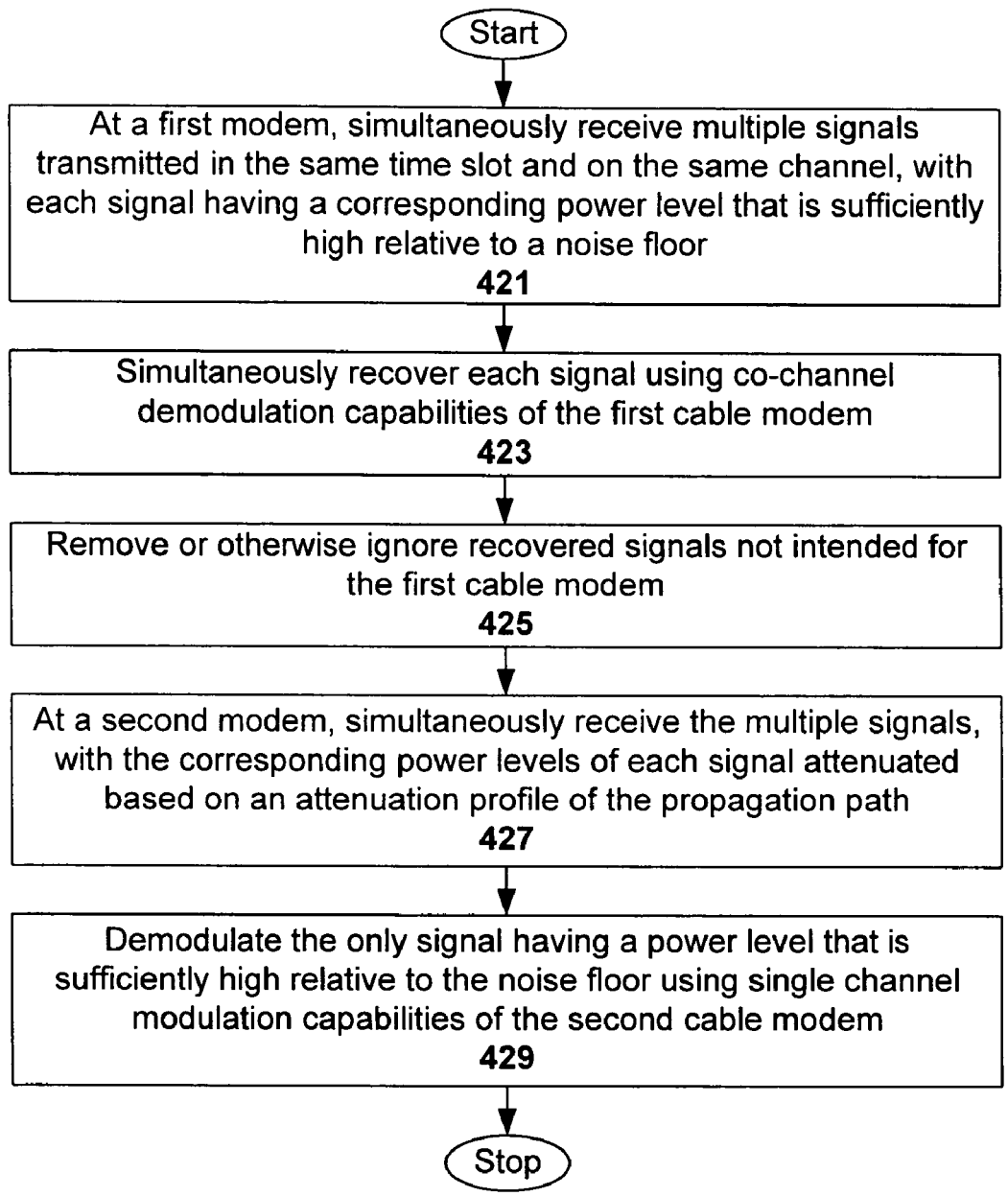
FIG. 4b illustrates a method for enhancing forward link capacity of a cable network in accordance with one embodiment of the present invention.

FIG. 4b illustrates a method for enhancing forward link (downstream) capacity of a cable network in accordance with one embodiment of the present invention. The method may be carried out, for example, by in a network having one or more MUD enabled downstream cable modems configured as discussed in reference to FIG. 1. Note, however, that the method provides backwards compatibility for propagation paths having at least one legacy modem located beyond a predefined attenuation threshold point of the path.

The method begins with, at a first cable modem, simultaneously receiving 421 multiple signals transmitted in the same time slot and on the same channel, with each signal having a corresponding power level that is sufficiently high relative to a noise floor. The received signals may have been transmitted, for example, by a CMTS associated with the propagation path, or other modems included in the cable network. In addition, the transmitted signals may have been amplified by one or more intermediate booster amplifier stages.

The method continues with, at the first cable modem, simultaneously recovering 423 each signal using co-channel demodulation capabilities of the first cable modem. The method then proceeds with removing 425 or otherwise ignoring recovered signals not intended for the first cable modem. In one embodiment, the recovered signals that are ignored are those that are identified as not intended for the receiving cable modem as indicated in header information associated with each signal.

In another embodiment, the recovered signals that are ignored are those that are below an established threshold for signal power, where the threshold is based on an attenuation profile received from the CMTS. The attenuation profile can be stored, for example, in the local control processor 125. Thus, a signal can be transmitted at a known power level, and the signal power level at its intended destination can be predicted based on the attenuation profile. As such, the threshold at the receiving modem can be set accordingly. This allows signals received in the same time slot to be distinguished based on their respective power levels. The method may further include decoding each signal, and performing any necessary formatting.

The method continues with, at a second cable modem, simultaneously receiving 427 the multiple signals, with the corresponding power levels of each signal attenuated based on an attenuation profile of the propagation path so that only one of the signals has a power level that is sufficiently high relative to the noise floor, and the other signals have corresponding power levels that are not sufficiently high relative to the noise floor (e.g., power levels at or below the noise floor).

The method continues with demodulating 429 the only signal having a power level that is sufficiently high relative to the noise floor using single channel modulation capabilities of the second cable modem, wherein the other attenuated signals are not detectable using single channel modulation capabilities. Note that this unique detection is possible because the detectable signal was transmitted at a stronger power level than the power levels at which the other signals in the same slot were transmitted. The method may further include decoding the demodulated signal, and performing any necessary formatting or other conventional processing.

With such a method, data can be transmitted in borrowed time slots of a particular channel when the legacy modems associated with that particular channel are far enough away that the known attenuation profile will effectively eliminate the potentially interfering signals. In this sense, modems physically located on or after a point in the propagation path associated with a known attenuation threshold can be legacy modems (which only employ single channel modulation capabilities), and not be affected by the time slot borrowing by data intended for MUD enabled cable modems located earlier in the propagation path (before the known attenuation threshold point).

In one embodiment, the removing step (425) can be carried out or otherwise controlled by the control processor (125) of the cable modem in FIG. 1, while the receiving and recovering steps of the first modem (421 and 423) can be carried out by the MUD module (115). The receiving and demodulating steps of the second modem (427 and 429) can be carried out by a conventional cable modem demodulator. Variations on this example embodiment, as well as the supporting roles of the front end (105), modulator (130), and other componentry (e.g., 110, 117, and 120) will be apparent in light of this disclosure as previously discussed.

Figure 4C:
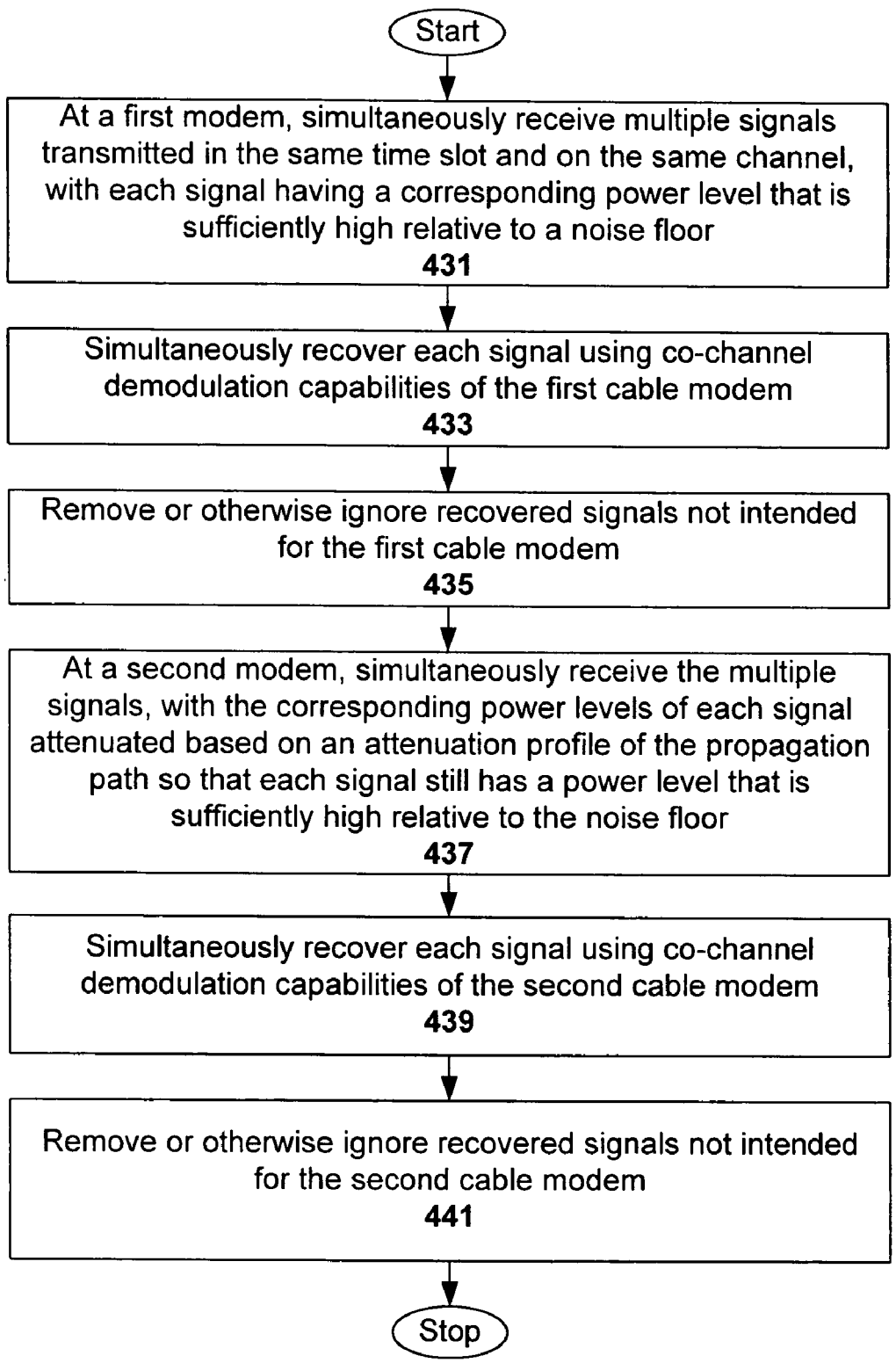
FIG. 4c illustrates a method for enhancing forward link capacity of a cable network in accordance with another embodiment of the present invention.

In an alternative embodiment shown in FIG. 4c, the second cable modem is also MUD enabled and configured in accordance with the principles of the present invention. Here, the method begins with, at a first cable modem, simultaneously receiving 431 multiple signals transmitted in the same time slot and on the same channel, with each signal having a corresponding power level that is sufficiently high relative to a noise floor. The received signals may have been transmitted, for example, by a CMTS associated with the propagation path, or other modems included in the cable network. In addition, the transmitted signals may have been amplified by an intermediate booster amplifier stage.

The method continues with, at the first cable modem, simultaneously recovering 433 each signal using co-channel demodulation capabilities of the first cable modem. The method then proceeds with removing 435 or otherwise ignoring recovered signals not intended for the first cable modem (e.g., as indicated by header information or distinct power levels associated with each signal). Note that this embodiment, the power levels of the transmitted signals in the same slot can have the same power level, as each cable modem in the path is MUD enabled. Thus, where transmit power levels of the signals are the same, the received power levels may be distinguished by taking into account the impact of the attenuation profile on each transmitted power level. However, the received power levels need not be known if other mechanisms are available for distinguishing the recovered signals (e.g., header information). The method may further include decoding each signal, and performing any necessary formatting.

The method continues with, at a second cable modem, simultaneously receiving 437 the multiple signals, with the corresponding power levels of each signal attenuated based on an attenuation profile of the propagation path so that each signal still has a power level that is sufficiently high relative to the noise floor. The method continues with simultaneously recovering 439 each signal using co-channel demodulation capabilities of the second cable modem, and removing 441 or otherwise ignoring recovered signals not intended for the second cable modem (e.g., as indicated by header information or distinct power levels associated with each signal). The method may further include decoding each signal, and performing any necessary formatting.

Extra capacity (bandwidth efficiency) is therefore provided transparent to legacy terminals operating in the network because both MUD enabled cable modems are assigned to the same slot. Through use of ranging data (e.g., transmit and receive signals of known power levels), the CMTS is able to track the propagation environment for each cable modem in the network, and an attenuation profile can thus be provided. This information enables the use of adaptive channel scheduling as explained herein for optimal network utilization and bandwidth efficiency.

In one embodiment, the removing steps (435 and 441) can be carried out or otherwise controlled by a control processor (125) configured in each of the first and second modems as previously discussed, while the receiving and recovering steps of each modem (431, 433, 437 and 423) can be carried out by a corresponding MUD module (115). Variations on this example embodiment, as well as the supporting roles of the front end (105), modulator (130), and other componentry (e.g., 110, 117, and 120) will be apparent in light of this disclosure as previously discussed.

Figure 4D:
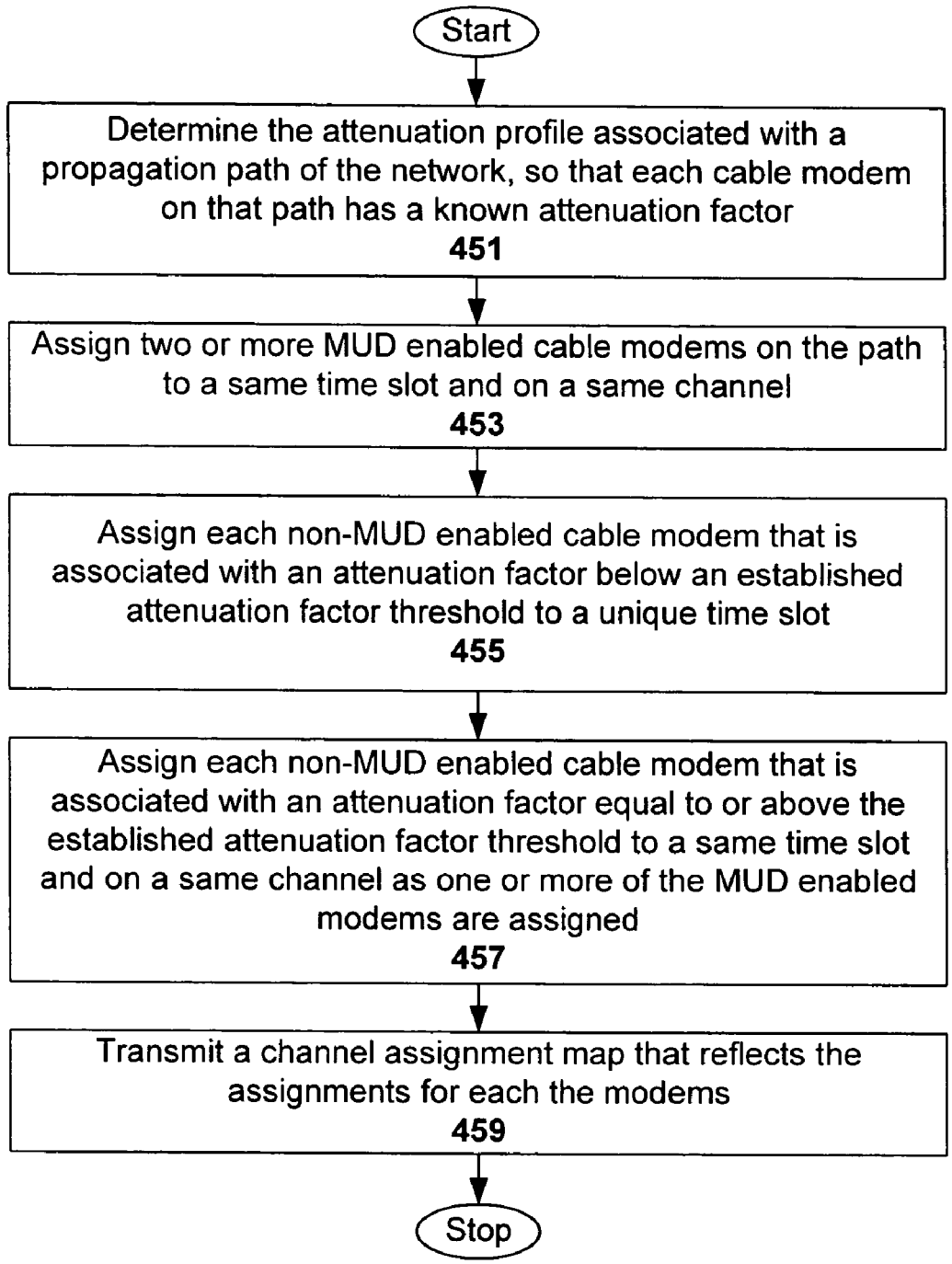
FIG. 4d illustrates a method employed by the CMTS of a cable network in accordance with another embodiment of the present invention.

A further method employed by the CMTS of a cable network is shown in FIG. 4d. This particular embodiment includes determining 451 the attenuation profile associated with a propagation path of the network, so that each cable modem on that path has a known attenuation factor. Determining this attenuation profile enables the CMTS to exploit the existing amplitude margin associated with the reverse links of the cable network. In one embodiment, the attenuation profile is determined by transmitting signals of known power levels between the CMTS and each cable modem in the network, thereby allowing an attenuation factor associated with each modem relative to the CMTS to be identified. For example, the CMTS modem can request each modem to transmit a signal at a specific power level, and the CMTS can then determine attenuation associated with each modem based on the received signal powers (as measured by the CMTS modem). In alternative embodiments, the attenuation profile could be determined based on known empirical data.

The attenuation profile could be, for example, an indexed lookup table listing each modem and its corresponding attenuation factor. Note that the attenuation profile may be broadcast and stored at each cable modem (e.g., during link initialization or training procedures). Each cable modem can store the entire profile, or simply its corresponding attenuation factor. Thus, signals intended for any one modem can be identified by their predictable received power level. For example, the predictable received power equals the known transmit power adjusted by the known attenuation factor (e.g., $P_{tx}$*Attenuation Factor).

The method further includes assigning 453 two or more MUD enabled cable modems of the network to a same time slot and on a same channel. In networks that include one or more non-MUD enabled modems, the method may proceed with assigning 455 each non-MUD enabled cable modem that is associated with an attenuation factor below an established attenuation factor threshold to a unique time slot, and assigning 457 each non-MUD enabled cable modem that is associated with an attenuation factor equal to or above the established attenuation factor threshold to a same time slot and on a same channel as one or more of the MUD enabled modems are assigned. Note that the established attenuation factor threshold generally corresponds to a physical point in the propagation path. Some of the cable modems on the path may be physically located before that point in the path, while of the modems on the path may be physically located after that point.

The method may further include transmitting 459 a channel assignment map that reflects the assignments for each of the modems. Steps 453, 455, 457, and 459 may be repeated for each propagation path of the network. This functionality can be carried out or otherwise controlled, for example, by the control processor of a CMTS communicatively coupled to the cable modems of each propagation path. It will be apparent in light of this disclosure how a robust bidirectional communication can take place between the CMTS and each of its communicatively coupled modems.

Control Processor Architecture

Figure 4E:
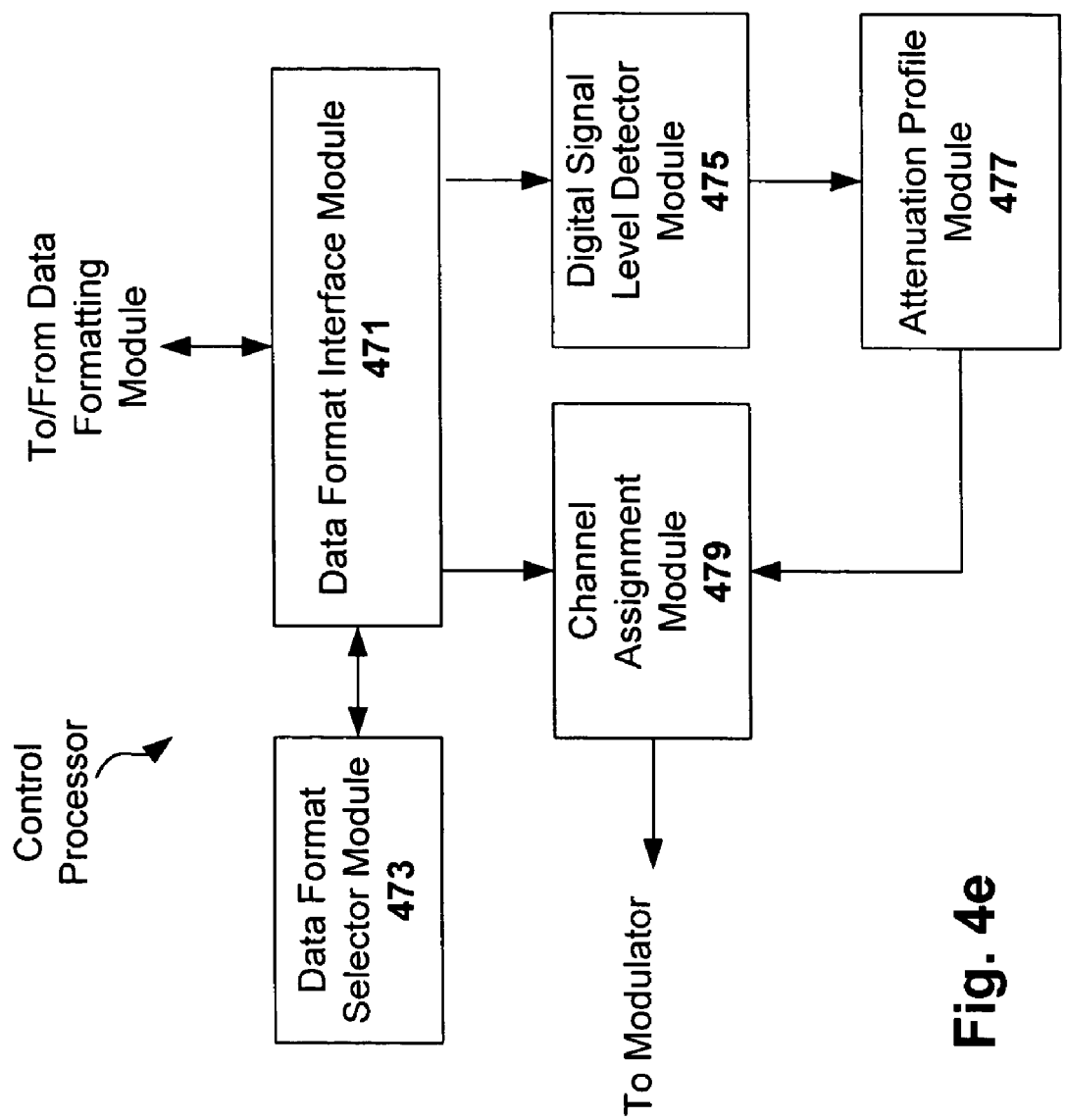
FIG. 4e illustrates a block diagram of control processor configured in accordance with one embodiment of the present invention.

FIG. 4e illustrates a block diagram of control processor configured in accordance with one embodiment of the present invention. The control processor includes a data format interface module 471, a data format selector module 473, a digital signal level detector module 475, an attenuation profile module 477, and a channel assignment module 479. These modules can be implemented, for example, as a set of executable instructions accessible by a microprocessor or other suitable processing environment (e.g., stored on a processor readable medium or in the microprocessor itself).

The data format interface module interfaces the control processor with the data formatting module, and is configured for bidirectional communication. This interface can further be adapted to remove or otherwise ignore recovered signals not intended for the cable modem. The data format selector module is programmed or otherwise configured to allow selection of one or more data format modes in which the data formatting module is capable of operating. The digital signal level detector module 475 is configured to detect the signal level/power of recovered signals.

Each detected power level can be stored and otherwise manipulated by the attenuation profile module 477. For example, the received power level of a test signal transmitted with a known power level can be used by the attenuation profile module 477 to compute and store an attenuation factor ($P_{rx}/P_{tx}$) associated with the transmitting modem. The attenuation profile module 477 can also compare received signal levels of actual user signals to known attenuation factors to determine which modem in the network sent the signal. The channel assignment module 479 is communicatively coupled to the data format interface module 471 and the attenuation profile module 477, and is programmed to provide data and corresponding time slot and channel assignments to the modulator of the cable modem.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for increasing bandwidth efficiency of a cable network including a head end Cable Modem Termination System (CMTS) communicatively coupled to a plurality of cable modems, the method comprising:
   determining an attenuation profile associated with a propagation path of the network, so that each cable modem on that path has a known attenuation factor;
   assigning each non-Multi User Detection (MUD) enabled cable modem that is associated with an attenuation factor below an established attenuation factor threshold to an unique time slot;
   assigning two or more MUD enabled cable modems on the propagation path to a same time slot and on a same channel;
   transmitting a channel assignment map that reflects the assignments for the cable modems;
   simultaneously receiving in the same time slot and on the same channel requests from two or more cable modems responding to the transmitted channel assignment map; and
   recovering each request using co-channel demodulation capabilities.

2. The method of claim 1 further comprising:
   assigning each non-MUD enabled cable modem on the path to a unique time slot.

3. The method of claim 1 further comprising:
   assigning each non-MUD enabled cable modem that is associated with an attenuation factor below an established attenuation factor threshold to a same time slot and on a same channel as one or more of the MUD enabled modems are assigned.

4. The method of claim 1 wherein the attenuation profile is determined by transmitting test signals of known power levels between the CMTS and each cable modem on the path, thereby allowing the attenuation factor associated with each modem relative to the CMTS to be identified.

5. The method of claim 1 wherein the attenuation profile is determined based on empirical data.

6. The method of claim 1 further includes broadcasting the attenuation profile to each cable modem on the path.

7. The method of claim 1 wherein the determining, assigning, and transmitting are carried out by a CMTS modem.

8. The method of claim 1 further comprising:
   computing channel assignments based on each request; and
   transmitting a second channel assignment map, wherein the second map includes a data grant for one or more modems that responded to the first channel assignment map.

9. The method of claim 8 further comprising:
   providing data received from cable modems responding to the second map to corresponding destinations.

10. The method of claim 1 wherein the determining an attenuation profile enables the CMTS to exploit existing amplitude margin associated with reverse links of the cable network.

11. A method for enhancing forward link capacity of a cable network including a Cable modem Termination System (CMTS) that is communicatively coupled with a plurality of cable modems by a propagation path, the method comprising:
   at a first cable modem
      simultaneously receiving multiple signals transmitted in a same time slot and on a same channel, with each signal having a corresponding power level that is sufficiently high relative to a noise floor;
      simultaneously recovering each signal using co-channel demodulation capabilities of the first cable modem;
      removing recovered signals not intended for the first cable modem based on at least one of the header information and distinct power levels associated with each recovered signal;
   at a second cable modem
      simultaneously receiving the multiple signals, with the corresponding power levels of each signal attenuated based on an attenuation profile of the propagation path so that only one of the received signals has a power level that is sufficiently high relative to the noise floor; and
      demodulating the one received signal having a power level that is sufficiently high relative to the noise floor using single channel modulation capabilities of the second cable modem, wherein the other attenuated signals are not detectable using single channel modulation capabilities.

12. The method of claim 11 wherein the second modem is physically located on or after a point in the propagation path associated with a known attenuation threshold, thereby ensuring non-detectability of the other attenuated signals by the second modem.

13. The method of claim 12 wherein the one received signal having a power level that is sufficiently high relative to the noise floor was transmitted at a first power level, and the other attenuated signals were transmitted at a second, lower power level.

14. A method of enhancing forward link capacity of a cable network including a Cable Modem Termination System (CMTS) that is communicatively coupled with a plurality of cable modems by a propagation path, the method comprising:
   at a first cable modem
      simultaneously receiving multiple signals transmitted in a same time slot and on a same channel, with each signal having a corresponding power level that is sufficiently high relative to a noise floor;
      simultaneously recovering each signal using co-channel demodulation capabilities of the first cable modem;
      removing recovered signals not intended for the first cable modem based on at least one of the header information and distinct power levels associated with each recovered signal;
   at a second cable modem:
      simultaneously receiving the multiple signals, with the corresponding power levels of each signal attenuated based on an attenuation profile of the propagation path so that each signal still has a power level that is sufficiently high relative to the noise floor;

simultaneously recovering each signal using co-channel demodulation capabilities of the second cable modem; and removing recovered signals not intended for the second cable modem.

15. The method of claim 14 wherein each of the signals recovered using co-channel demodulation capabilities of the second cable modem were transmitted at substantially the same power level.

16. A cable modem which enables efficient use of bandwidth in a cable network including a plurality of cable modems, the cable modem comprising:

a multiuser detection module adapted to simultaneously demodulate and recover K interfering signals transmitted at the same time on the same channel using co-channel demodulation;

a data formatting module operatively coupled to the multiuser detection module, and adapted to produce network data packets for at least one of the K recovered interfering signals; and a control processor operatively coupled to the data formatting module, and adapted to exploit existing amplitude margin associated with one or more propagation paths of the cable network by deliberately scheduling interfering transmissions based on known attenuation characteristics of the one or more propagation paths wherein the network includes a propagation path having both Multi User Detection (MUD) enabled and non-MUD enabled modems, and the control processor is further adapted to assign each non-Mud enabled cable modem that is associated with an attenuation factor below an established attenuation factor threshold to a unique time slot, thereby enabling a legacy protocol mode.

17. The modem of claim 16 wherein the control processor is further adapted to assign each non-MUD enabled cable modem that is associated with an attenuation factor equal to or above an established attenuation factor threshold to a same time slot and on a same channel as one or more of the MUD enabled modems are assigned.

18. The modem of claim 16 wherein the control processor includes:

a data format interface module configured for bidirectional communication, and adapted to interface the control processor with the data formatting module; and a data format selector module configured to allow selection of one or more data format modes in which the data formatting module is capable of operating.

19. The modem of claim 18 wherein the data format interface module is further configured to remove recovered signals not intended for the cable modem.

20. The modem of claim 16 wherein the control processor includes:

a digital signal level detector module configured to detect the signal level of recovered signals; and an attenuation profile module configured to compute and store attenuation factors associated with other modems of the network.

21. The modem of claim 20 wherein the attenuation profile module is further configured to compare received signal levels of actual user signals to known attenuation factors to determine which modem in the network sent the signal.

22. The modem of claim 16 wherein the cable modem includes a modulator, and the control processor further includes:

a channel assignment module configured to provide data and corresponding time slot and channel assignments based on the known attenuation characteristics to the modulator.

* * * * *